United States Patent

[11] 3,628,031

[72] Inventor Leo L. Azure, Jr.
Richland, Wash.
[21] Appl. No. 797,160
[22] Filed Feb. 6, 1969
[45] Patented Dec. 14, 1971
[73] Assignee Automata Corporation
Richland, Wash.

[54] CLOSED LOOP CONTROL SYSTEM FOR AUTOMATIC SENSITIVITY CONTROL OF TRANSDUCER
23 Claims, 4 Drawing Figs.

[52] U.S. Cl. ................................................. 250/219DC,
250/219 D
[51] Int. Cl. ........................................................ G01n 21/30
[50] Field of Search ............................................ 250/214,
219 D, 219 DC, 219 DD; 307/235, 311

[56] References Cited
UNITED STATES PATENTS

| | | | |
|---|---|---|---|
| 3,131,316 | 4/1964 | Glaz | 307/311 X |
| 3,189,745 | 6/1965 | Van Reymersdal | 307/311 X |
| 3,302,034 | 1/1967 | Nowell | 307/235 |
| 3,461,303 | 8/1969 | Hanson | 250/219 IDC |
| 3,435,239 | 3/1969 | Stalberg | 250/220 SP |
| 3,444,358 | 5/1969 | Malone | 250/219 ID X |
| 3,487,225 | 12/1969 | Button | 356/205 X |

OTHER REFERENCES

Braun, R. J., " Wide Response Amplifier with Automatic Threshold Control," IBM Technical Disclosure Bulletin, Vol. 8, No. 4, Sept. 1965, pp. 690– 691

*Primary Examiner*—James W. Lawrence
*Assistant Examiner*—D. C. Nelms
*Attorney*—Irons, Sears, Staas, Halsey & Santorelli ABSTRACT: A sensitivity control circuit for a of device automatically and periodically establishes a reference level corresponding to the output of the device when sensing a reference level of illumination and maintains that reference level for referencing the output of the device during subsequent sensing operations. The reference level corrects for variations in the output of the device resultant from drift and other factors unrelated to information to be sensed. A particular application of the circuit is in a test scoring machining having optical scanning of information presented on cards wherein the reference level is established in response to sensing of card background in timed relationship to the scanning of the card.

INVENTOR
LEO L. AZURE, JR.

BY Brufsky and Staas

ATTORNEYS

INVENTOR
LEO L. AZURE, JR.

INVENTORS
LEO L. AZURE, JR.

BY Brufcky and Staas

ATTORNEYS

CLOSED LOOP CONTROL SYSTEM FOR AUTOMATIC SENSITIVITY CONTROL OF TRANSDUCER

BACKGROUND OF THE INVENTION

1. Field of the Invention

This invention relates to a sensitivity control system for photoelectric devices and, more particularly, to a system for periodically and automatically establishing a reference level to which the output of the device is referred during subsequent sensing operations to correct for variations in the output of the device due to drift and other factors unrelated to the sensing of information.

2. Description of the Prior Art

Numerous systems employ photoelectric devices, including various types of electro-optical transducers, conventionally known as photocells, for converting visual information to corresponding electrical signals. Such systems include computers and other data processing systems, a specific example being test scoring machines, wherein information presented on cards is to be converted to corresponding electrical signals for processing. The accuracy of such systems is, of course, dependent on the accurate conversion of the optically detected, visual information to electrical signals.

As is well known, the output of such devices is subject to drift, as a result of various factors including aging of the device, variations in the line voltage from which the device is energized, and variations in the intensity of the source of illumination. In addition, variations in the level of illumination of the background from which the information is detected also affect the output of these devices, and render it more difficult to detect the electrical signal output of the device, produced in response to sensing of information, from signal outputs produced in response to sensing of the background. Typically, a threshold level is established which the output of the device must exceed if the output is to be recognized as the sensing of information, as distinguished from background. When a large number of such devices are used for simultaneous scanning of plural sources of information, the difficulty of detecting sensed information from background information in the output of the devices becomes even more acute.

Numerous circuits have been provided in the prior art to reduce, or minimize, the above-discussed variations in the output of such photoelectric devices, hereinafter referred to as photocells, resultant from drift and other factors, such as background illumination variations. If the background illumination varies greatly, it is very difficult to establish a threshold which assures that the photocell output is a function of information detection and not merely the sensing of the background. The variations resultant from drift likewise cause the photocell output to vary and render uncertain the distinction between sensing of information and background.

These problems become more complex in systems requiring a plurality of photocells which are employed simultaneously for the scanning of plural sources of information, since in addition to the above-described factors causing variations in the output of the photocells, the relative sensitivities of individual photocells must be considered in comparing their respective output signals.

Systems have been provided in the prior art for effecting background compensation for one or more information sensing photocells through the use of an additional photocell which senses the background. The output of this photocell is used to automatically adjust, or reference, the outputs of the information sensing photocells relative to the background. The use of an additional photocell is, of course, undesirable in that it requires additional circuitry and components. The reference photocell is itself subject to aging and thus the compensation provided is also subject to error.

Where plural photocells are employed, systems heretofore provided in the prior art typically employ individual amplitude control means which must be manually adjusted for each photocell to achieve equal amplitude outputs when the photocells are sensing substantially equal levels of illumination. The alignment procedures are both complicated and time consuming, and due to unequal aging of the various photocells, require realignment. Other systems of the prior art have proposed means for automatically establishing a reference level to which the output of a photocell is referred during sensing operations. Such systems may correct for one or more factors which contribute to photocell drift, but generally are inadequate for compensating for all such factors and particularly in additionally compensating for variations in background illumination. Automatic compensation systems of the prior art typically have been restricted to establishing a reference level at a specified maximum or minimum level of intensity of illumination to which the photocell is exposed, and thus such reference level is not necessarily related to the actual levels of illumination to which the photocell will be exposed during sensing operations. Further, such compensation systems of the prior art have been generally complex and expensive.

SUMMARY OF THE INVENTION

These and other defects and inadequacies of the systems of the prior art are overcome by the automatic sensitivity control circuit of the invention. The system of the invention provides for automatically and periodically establishing a reference level corresponding to the output of the photoelectric device, such as a photocell, when sensing a reference level of illumination. That reference level is maintained and the output of the photocell is referred to that reference level during subsequent sensing or scanning operations. The system of the invention is particularly adapted for data processing systems which require that input information be optically detected and converted to electrical signals for further processing. Generally, the information is detected by occurring at a level of illumination which is distinguishable from a background level and may include dark information indicia on a light background or light information indicia on a dark background.

In accordance with the invention, there is provided an automatic sensitivity control circuit coupled to the output of the sensing photocell, and from which the output, electrical signal is derived. The system includes means for generating an enabling pulse in timed relationship to the presentation to the photocell of information to be scanned, or sensed, during the interval of which pulse, the photocell is exposed to a reference source of illumination. During that time interval, the circuit responds to the output of the photocell to establish a reference level. That reference level is maintained during subsequent sensing operations of the photocell and the circuit refers the output of the photocell to the thus-established reference level. The reference level, and the referring of the photocell output to that reference level, corrects for the above-discussed variations in the photocell output which do not relate to the sensing of information and may include not only photocell drift and related factors, but also background illumination variations. Any desired reference source of illumination may be selected, as long as the level of that source does not exceed the extreme of illumination level of the information to be sensed. As noted, the information may comprise either dark or light indicia on, respectively, a contrasting light or dark background.

The automatic sensitivity control system of the invention is disclosed herein as incorporated in a test grading machine for grading answer indicia provided on test cards, to problems of the multiple choice type, by comparison with correct answer indicia on a master card. The test and master cards include corresponding formats of plural answer indication areas for each of the plurality of problems, to which areas indicia are applied to represent the selected answers. Corresponding areas of the plurality of problems are aligned in columns, and there is also provided a column of timing marks positioned generally in alignment with the corresponding answer indication areas for each problem. Means are provided for transporting the test cards, individually and in succession, and in timed relationship with the transport of a master card through corresponding test and master card sensing stations. Each of the sensing stations includes a plurality of photocells for scanning the corresponding columns of answer indication areas and timing marks on the associated master and test cards.

The automatic sensitivity control system of the invention includes means responsive to the advancing of the cards through the associated sensing stations for generating the above-discussed enabling pulses. In one embodiment, the pulse is generated in response to advancement of the leading edges of the master and test cards into position for sensing by the associated photocells for establishing the reference level in response to the photocell output when sensing the card background. The reference level is then maintained throughout sensing of answer indicia related to the given card, and is periodically reestablished for each successive card. In a further embodiment of the invention, the enabling pulse is generated in response to detection or sensing of the timing marks and provides for establishing the reference level in response to sensing of the background by the corresponding photocells during an interval which terminates prior to detection of the next timing mark and associated answer indicia. In this latter embodiment, the reference level is rapidly and periodically checked throughout scanning of a single card and is particularly useful where the card background of a single card may vary gradually or rapidly throughout its scan length.

These and other features and advantages of the sensitivity control system of the invention will become apparent and be more fully understood from the following description of the invention.

DETAILED DESCRIPTION OF THE INVENTION

The automatic sensitivity control system of the invention provides for correcting variations in the output of a photocell resultant from any of various factors generally referred to as photocell drift and also from variations in background illumination, all of which are unrelated to the sensing or detection of information. Typical factors contributing to photocell drift include aging of the photocell, variations in line voltage from which the photocell is energized, and variations in the level of illumination on the composite of information and background to which the photocell is exposed. To accomplish this correction, the system of the invention includes a circuit which automatically and periodically establishes a reference level, the value of which is a function of the above-noted variations. The output of the photocell is referred to this reference level during scanning operations during a selected interval of time following each successive, periodic adjustment or reestablishment of the reference level.

In systems employing a plurality of photocells which simultaneously scan information and in which the outputs of the plurality of photocells must be compared or otherwise related for the processing and evaluation of the thus-detected information, a further error factor is encountered. This results from the variations in the sensitivities of individual photocells, regardless of aging or the other factors discussed previously. The system of the invention is particularly useful with such plural photocell systems since the reference level established will also be a function of the sensitivity of each such photocell. Thus, the outputs of the individual photocells, when referred to their respective reference levels, may be directly compared for evaluating the information detected by the photocells and represented by their respective outputs.

To more readily appreciate the features of the invention, the automatic sensitivity control system is disclosed herein as incorporated in a test grading machine incorporating an optical sensing station having a plurality of photocells for sensing information from data-bearing cards, termed test cards and master cards. The test grading machine may be of the type disclosed in U.S. Pat. application Ser. No. 621,747, entitled "Test Grading and Marking Method and Apparatus" of Leo L. Azure, Jr. and assigned to the assignee of the present invention. Such a machine is disclosed and discussed herein only to the extent necessary to understand the use of the automatic sensitivity control system of the invention therewith, and reference may be had to the application for a more detailed description of its operation.

Figure 1:
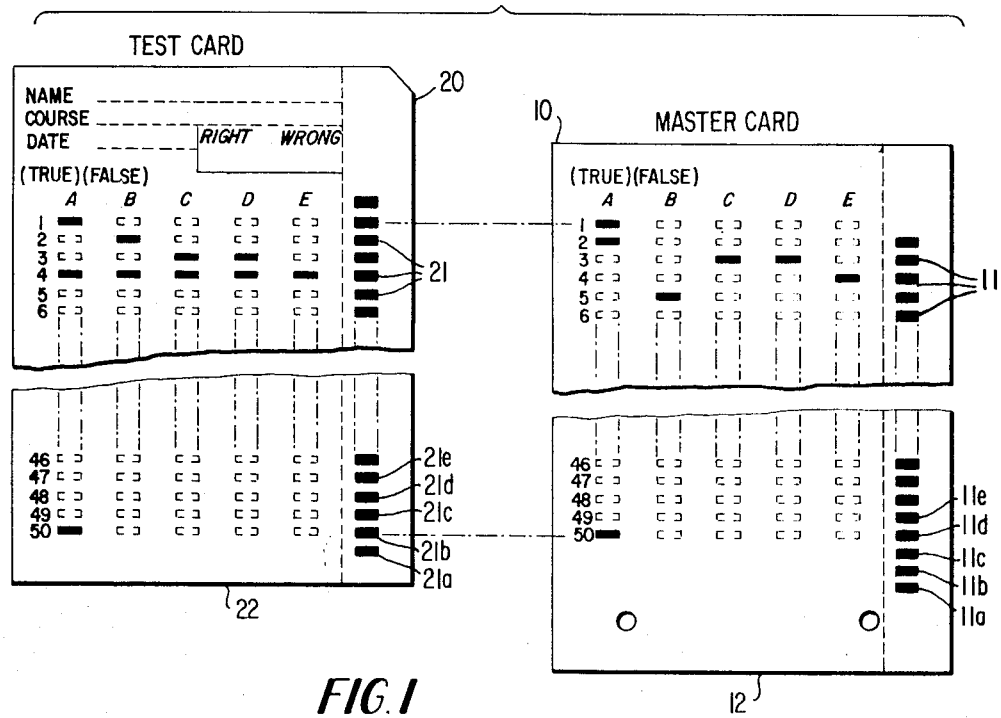
FIG. 1 shows an answer card and a master card suitable for use in test grading and marking machines.

In FIG. 1 is shown a master card 10 and a test card 20 suitable for use with a test grading machine of the type of the referenced application. Each of the cards 10 and 20 include a plurality of answer indication areas arranged in vertically aligned columns A through E and horizontally aligned groups or rows numbered 1 through 50, corresponding respectively to multiple choice answer selections to each of a plurality of 50 problems in a test. The cards 10 and 20 further include corresponding columns of timing marks 11 and 21, respectively, which are generally positioned in horizontal alignment with corresponding rows of answer indication areas. As is typical, and for a reason to be described, the height of the answer indication areas is less than the height of the timing marks. In conventional manner, correct answer indicia or marks are provided in the appropriate columns for the plurality of problems of the master card, and answer indicia representing selected answer choices are applied to the appropriate answer indication areas for the plurality of problems on the test cards. The displacement of certain of the timing marks from alignment with corresponding problem answer indication areas is for a reason to be explained.

Figure 2:
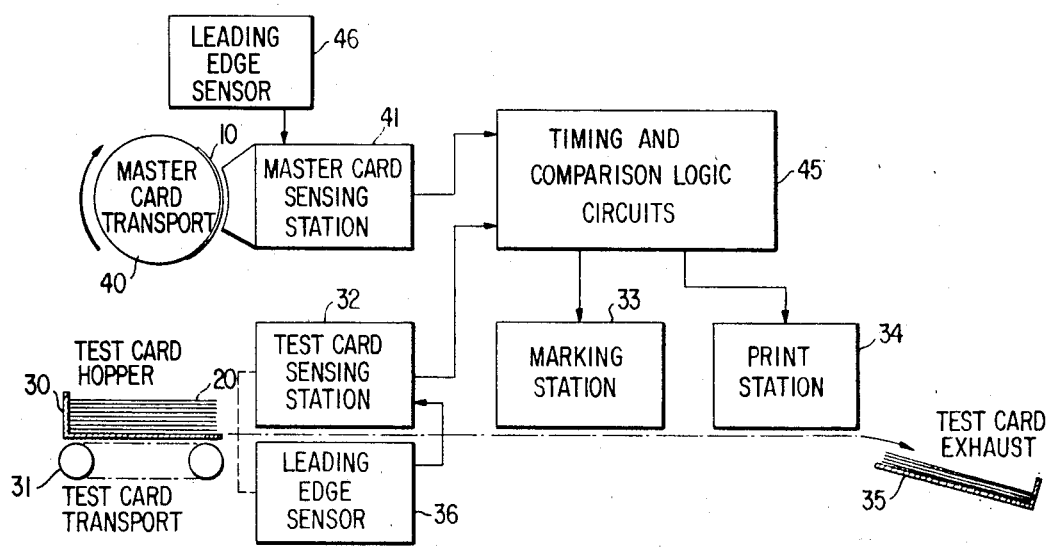
FIG. 2 is a block diagram of the basic components of a test grading machine employing the cards of FIG. 1.

In FIG. 2 is shown a block diagram of a test grading machine for grading and scoring a plurality of test cards of the type 20 by comparison with information sensed from a single master card 10. A plurality of test cards 20 are received in a hopper 30 in superposed or stacked relationship, with the bottom edge 22, shown in FIG. 1, in a leading position in the direction of transport of the cards through the machine. A transport system 31 advances the cards through a test card sensing station 32, past a marking station 33 and a print station 34 to an exhaust hopper 35. A single master card 10 is mounted on a master card transport 40 for successive advancement, again with the bottom edge 12 thereof, shown in FIG. 1, in leading position past, or through, a master card sensing station 41. Each of the master and test card sensing stations 41 and 32 include a plurality of photocells aligned with corresponding columns of answer indication areas and timing marks on the associated cards for detecting indicia in those columns. As is apparent, the photocells of each station associated with the detection of timing marks produce an output pulse in response to detection of each timing mark and thus for marks 11a, 11b, 11c,...and 21a, 21b, 21c,..., in succession. The photocells aligned with the columns of answer indication areas simultaneously sense each area for each problem, for all problems in succession, and only those photocells detecting an indicia in the respectively corresponding column provide an output, as the rows of answer indication areas corresponding to the plurality of columns are presented to the sensing stations, in succession.

The test cards are transported at a constant rate along the path indicated by the arrow, and the master and test card transports 40 and 31 are suitably linked to effect movement of the respective cards through the corresponding sensing stations at the same rate, and in synchronized relationship. In general, synchronized operation requires that the corresponding timing marks 11a and 21a, 11b and 21b, etc., are sensed simultaneously at the corresponding sensing stations. As is apparent, and for a reason to be described, the answer indicia for the problems presented on the test card are sensed in advance of, but in synchronized relationship to, the sensing of the corresponding answer indicia for the problems on the master card.

The outputs of the sensing stations are supplied to the timing and comparison logic circuits 45. The circuits 45 effect suitable storage of the detected answer indicia for comparison with the corresponding correct answer indicia detected from the master card, in sequence, for the plurality of problems. The comparison circuits determine correct from incorrect answers on the test card and supply appropriate control signals to the marking station 33 to provide corresponding marks on the test card as it is advanced therethrough. The circuits 45 may also provide for accumulation of total counts of right and wrong answers for each test card and supply appropriate control signals to the print station 34 for effecting print out of these total scores on the card as it is advanced therethrough and, subsequently, is exhausted to the hopper 35.

In accordance with one embodiment of the invention, the periodic and automatic establishment of the reference level for the photocells of the sensing stations 41 and 32 is effected as each successive test card is advanced into the test card sensing station 32 and, in synchronism therewith, the master card 10 is advanced into the master card sensing station 41. Any suitable means may be employed for detecting this condition in each of the sensing stations. Thus, there is shown diagrammatically a leading edge sensor 36 for detecting advancement of the leading edge of the test cards into the sensing station 32 and a leading edge sensor 46 for detecting advancement of the leading edge of the master card into the master card sensing station 41. These sensors 36 and 46 may comprise a suitable photocell for detecting this condition; alternatively, the sensor 36 may comprise a trip switch actuated by advancement of the test card and the sensor 46 may comprise a switch actuated by a cam driven in synchronism with the master card transport. As will be described, each of these sensors 36 and 46 serves to produce, or cause the production of, an enable pulse during the interval of which a reference level is established for each photocell of the corresponding stations by the respectively associated automatic sensitivity control circuits. These enable pulses are produced in time to assure that the photocells are exposed to a background portion of the associated cards as they are advanced into sensing positions in the associated sensing stations. In accordance with this embodiment, therefore, the reference level is established on a periodic basis related to the advancement of each successive test card into the test card sensing station and the corresponding, repeated advancement of the master card into the master card sensing station in synchronized relationship therewith. The reference level thus established is maintained for the duration of scanning of each such test card and the related scanning of the master card, and is reestablished for the successive card scans.

In accordance with an alternative embodiment of the invention, the periodic establishment of the reference level may be effected a plurality of times during scanning of both the test and master cards, and particularly in response to detection of the timing marks 11 and 21 on each of these cards. In this embodiment, the reference level is established prior to sensing of the answer indication areas and related timing marks for each individual problem, for all problems in succession, on each of the master and test cards. Any apparatus providing periodic pulses occurring in timed relationship to the presentation of answer indicia or other information to photocell sensing means may effect such a periodic setting of the reference level in accordance with the system of the invention. The test grading machine with which the automatic sensitivity control system of the invention is disclosed generates periodic pulses in response to detection of the timing marks on the cards for synchronization and other purposes in the operation of the machine. These pulses conveniently may be employed as the enable pulses for establishing the reference level in the control circuits associated with the photocells of the sensing stations. For a better understanding of the generation of these pulses, reference is now had to FIG. 3.

Figure 3:
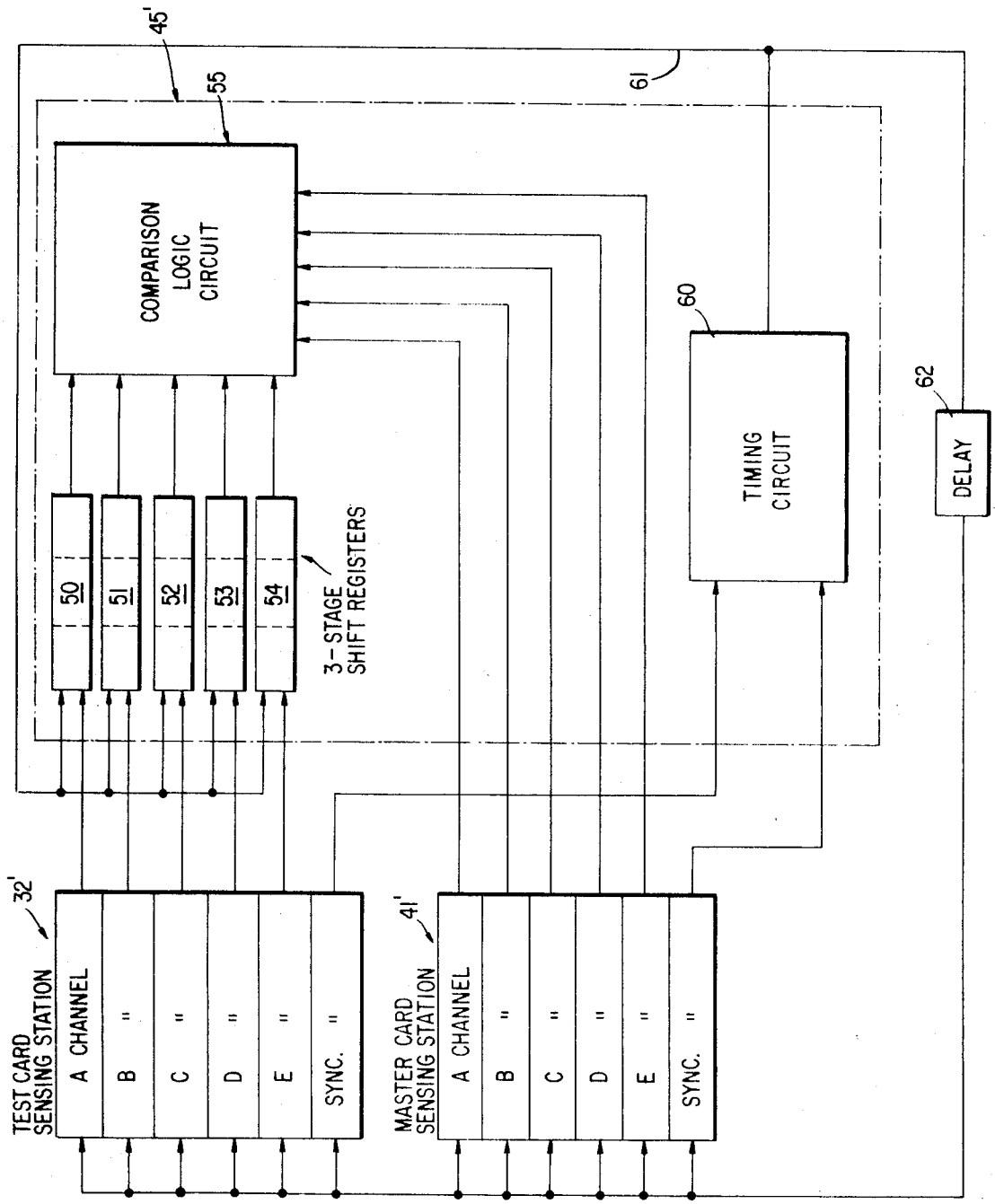
FIG. 3 is a more detailed block diagram of certain of the components of the machine of FIG. 2.

In FIG. 3, certain of the block system of FIG. 2 are shown in more detail. The test and master card sensing stations 32' and 41' each include channels A through E and a sync (synchronization) channel including photocells and associated optical systems for scanning the corresponding columns of answer indication areas A through E and the columns of timing marks 21 and 11 of the test and master cards 20 and 10, respectively. A circuit in accordance with the control system of the invention is provided for each such photocell.

The outputs of the channels A through E of the test card sensing station 32' are supplied to corresponding ones of a plurality of three-stage shift registers 50 through 54, of conventional type, of the timing and comparison logic circuits shown enclosed in a block labeled 45'. The outputs of the shift registers are supplied to a comparison circuit 55, to which the outputs of channels A through E of the master card sensing station 41' are also supplied. The outputs of the sync channels of the stations 32' and 41' are supplied to a timing circuit 60. As discussed in detail in the above-referenced application, the timing circuit 60 responds to the receipt of a pulse from each of the sync channels of the stations 32' and 41', generated by detection of corresponding ones of the timing marks 21 and 11 of the test and master cards 20 and 10, respectively, to generate an output pulse representing completion of scanning of those related timing marks and thus of the corresponding row of answer indication areas in proper, synchronized relationship. The timing circuit produces an output pulse on the line 61 which is supplied as a shift pulse to the input of each of the three-stage shift registers 50 through 54. In response to the shifting operation of the shift registers due to the shift pulses, there will be presented at the output stage of the shift registers 50 through 54 the answer information detected from the answer indication areas for a given problem of the test card in timed relationship with the detection of the correct answer information for that same problem from the master card. The comparison circuit 55 thereby receives the answer information for each successive problem from the master and test cards in appropriate, timed relationship, to effect the answer comparison operation.

The output pulse produced on line 61 is conveniently employed to generate an enable pulse for the reference level setting operation in the automatic sensitivity control circuits for each of the photocells of the sensing stations 32' and 41'. With reference to the master and test cards of FIG. 1, it is apparent that, with regard to the speeds of electronic circuits, a substantial amount of time, and thus extent of background, exists between successive timing marks. Thus, preferably, the generation of enable pulses is delayed for a predetermined time following detection of the trailing edges of the corresponding timing marks. Such a delay effectively displaces the selected background area employed in the level setting operation from the trailing edges to an intermediate position between answer indication areas and associated timing marks for successive problems. By this technique, greater assurance is provided that the level setting will occur during exposure to background, and not improperly applied answer indicia which extend beyond the confines of the answer indication area brackets, and even beyond the trailing edges of the timing marks. Thus, a delay circuit 62 may be provided which receives the output from the timing circuit 60 to produce this delay in the enable pulse following the trailing edge of the timing mark. In addition, the circuit 62 may provide wave shaping to attain a pulse of desired duration at a desired time period following scanning of each timing mark. This delay circuit, alternatively, may be provided in the timing circuit 60 for the generation of the shift pulse. In the referenced application, in fact, such a delay circuit is provided, from which a suitably delayed pulse may be directly obtained for use as the enable pulse. Thus, the particular portion of the background between successive timing marks and thus between successive answer indication areas may be very accurately selected for the level setting operation.

Figure 4:
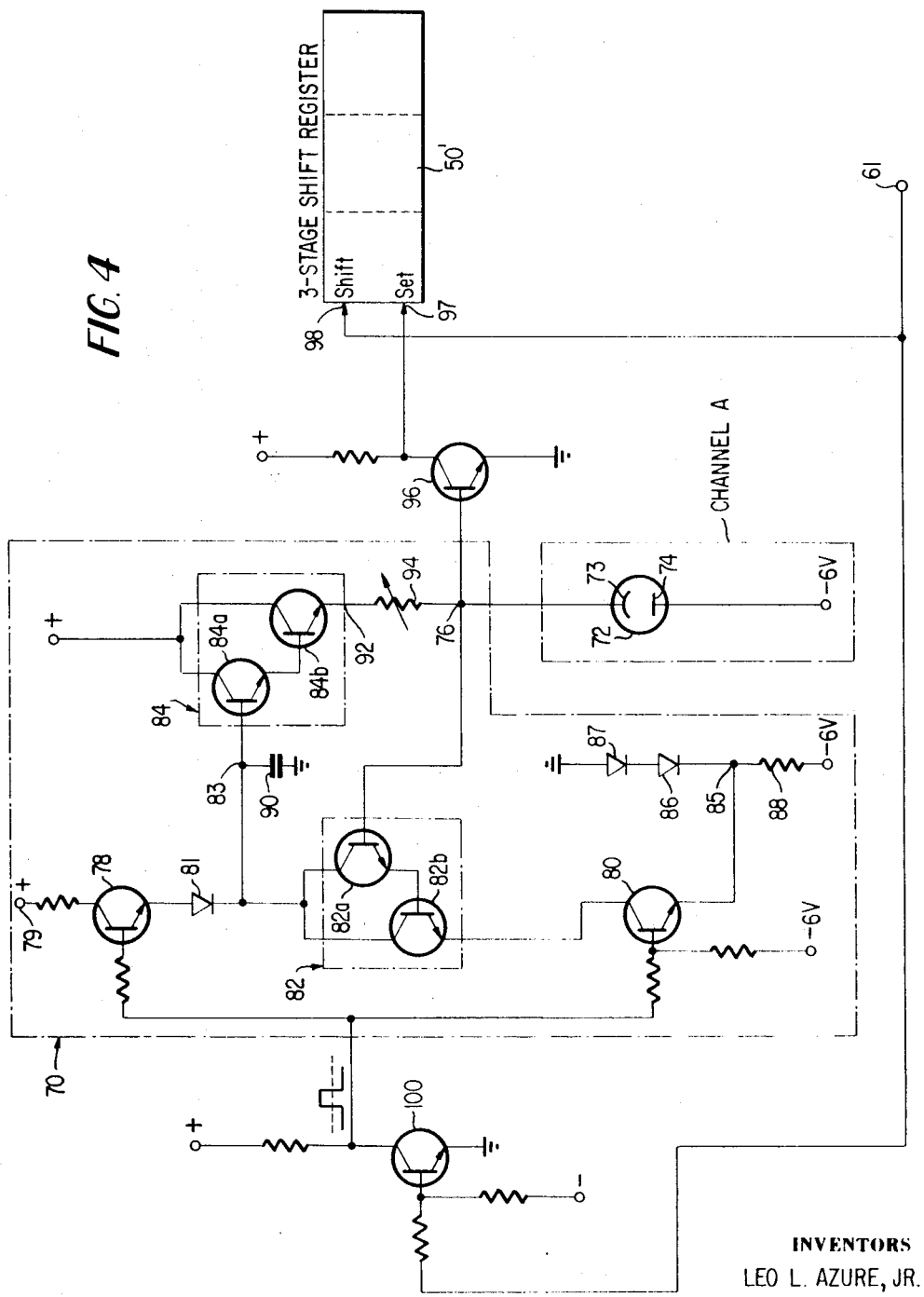
FIG. 4 is a schematic of a circuit in accordance with the automatic sensitivity control system of the invention.

In FIG. 4 there is shown the automatic sensitivity control circuit of the invention in association with a representative channel (channel A) of a test card sensing station employed in a test grading machine. The sensitivity control circuit may be utilized with any photocell device in any information sensing application and is shown in FIG. 4 in connection with a sensing station of a test grading machine for illustrative purposes only. Turning now more specifically to FIG. 4, there is shown a sensitivity control circuit 70, the output of which is coupled to a photocell 72 having an anode 73 and a cathode 74. This photocell 72 is connected at its cathode to a source of negative potential, for example, −6 volts. The anode 73 is connected to terminal 76. In a particular application, photocell 72 is positioned in one channel of the sensing stations 32′ or 41′ such that the electrical resistance of the photocell varies in response to the amount of illumination reflected from that portion of the card being sensed. In one embodiment, cards of the type shown in FIG. 1 reflect a beam of light from a source of illumination to the photoconductive portion of the photocell. Dark marks are less reflective of this illumination than the card background such that the photocell 72 is more conductive when card background is sensed and less conductive when a mark is sensed. In the alternative, the marks may be more reflective of illumination than card background such that the photocell is more conductive when sensing a mark. The sensitivity control circuit 70 of the invention may be utilized in any information sensing system employing photocells. Thus, the invention finds application in systems in which information is placed on generally opaque cards by means of punches, and in which photocells sense the amount of light passing through holes in the punch cards.

In accordance with the embodiment illustrated in FIG. 4, one sensitivity control circuit 70 is provided for each photocell in the test grading machine. For example, in a five channel (A-E) test card arrangements, including one sync channel, a total of six control circuits are to be utilized in each of the master and test card sensing stations. Control circuit 70 includes transistors 78 and 80, each having a base, emitter, and a cathode. These two transistors function as switches in control circuit 70. The collector terminal of transistor 78 is connected through a load resistor to a positive power supply terminal 79 and the emitter terminal of transistor 78 is connected to a diode 81. The cathode of diode 81 is connected to both the external collector terminal of a transistor circuit 82 and the external base terminal of a transistor circuit 84 via terminal 83. Both transistor circuits 82 and 84 may comprise transistorized circuits formed on a single chip and include two cascaded silicon transistors (82a, 82b and 84a, 84b) connected in the so-called "Darlington" circuit configuration. The external emitter terminal of Darlington circuit 82 is connected to the collector terminal of transistor 80 and the emitter terminal of transistor 80 is connected to terminal 85. Two series-connected silicon diodes 86 and 87, both of which possess a forward voltage drop of 0.75 volts when conducting, are connected between a ground potential terminal and terminal 85, and a load resistor 88 is connected between terminal 85 and a negative power supply potential, of, for example, −6 volts.

A storage capacitor 90 is connected between terminal 83, and thus to the external collector terminal of Darlington circuit 82, and a ground potential terminal. The external emitter terminal 92 of Darlington transistor 84 is connected to terminal 76 through an adjustable resistor 94.

Transistor 96, connected in a grounded emitter configuration, is connected at its base to terminal 76. In the embodiment shown in FIG. 4, the output of this transistor 96, from the collector terminal, is connected to a three-stage shift register 50′ having a set input terminal 97 and a shift input terminal 98. In FIG. 4, only one sensitivity control circuit and associated photocell channel, and particularly a test card answer mark channel, was selected for description. Since the outputs from channels A through E of test card sensing station 32′ (FIG. 3) are connected to shift registers 50–54, the output of transistor 96 has been shown as being coupled to the set terminal 97 of shift register 50′.

In FIG. 4 line 61 is connected to the shift input terminal 98 of shift register 50′ to advance the information stored in the shift register as previously described. Line 61 is also connected to the base terminal of a transistor 100 connected in a grounded emitter configuration, the output of transistor 100 being coupled to the base terminals of transistors 78 and 80. Pulses on line 61 are coupled to sensitivity control circuit 70 via an inverting transistor 100, since the pulses from timing circuit 60 in FIG. 3 are negative going. In a particular application, the enabling pulses may be positive going, in which case inverting transistor 100 may be omitted.

Generally, the circuit of FIG. 4 operates to reference the output of each photocell to a preselected potential during a selected time period related to the passage of the cards, either the master or the test cards, through their respective sensing stations and thus while the photocell of each channel of both stations is sensing a preselected portion of the background, which, in this case, comprises a selected area, or areas, of the card background.

Referring more specifically to the circuit of FIG. 4, during the occurrence of an enable pulse on line 61, transistor 100 is rendered nonconductive and thus inverts the negative-going pulse to produce a positive-going pulse at its collector terminal. The positive-going pulse renders each of the switching transistors 78 and 80 conductive, thereby completing a circuit for conduction of the Darlington transistor circuit 82.

As is well known, the Darlington circuit 82 includes two transistors connected in a so-called Darlington configuration, the base-emitter junction of each of which presents a 0.75 voltage drop as is typical of silicon junctions. There thus is produced, during the enable pulse, and between the external base and emitter terminals of the Darlington circuit 82, a 1.5-volt drop during this conduction interval. The external emitter terminal of Darlington transistor 82 is further connected through the collector-emitter conducting path of transistor 80 which, during conduction, is of negligible resistance value. The conducting transistor 80 connects the Darlington external emitter terminal to the junction 85 of the series-connected diodes 86 and 87 and resistor 88, connected between ground and −6-volts power supply terminals. The diodes 86 and 87 are silicon diodes and thus present a total of 1.5-volts drop across the series connection thereof. The junction 85 is thus maintained at −1.5 volts.

The combination of diodes 86 and 87 and Darlington circuit 82, during the conduction interval defined by an enable pulse, operates to clamp the junction 76 to ground potential.

During this reference setting interval, that is, during the presence of an enable pulse, capacitor 90 is connected in a series circuit with transistor 78 and diode 81 to be charged from the positive power supply terminal 79, or to be discharged through the Darlington circuit 82 and the elements connected in its load current circuit to ground. The charge which ultimately results on capacitor 90 is a function of the conduction of the photocell 72, while the latter is exposed to reference background and also referenced to ground potential at the junction 76 by the circuit described above. Further, the reference level potential is established at a desired median or center value with respect to the value of the source of energizing potential and the output of the photocell when exposed to the selected background, by the setting of variable resistor 94 for a purpose to be now explained.

During the enable pulse, it is essential that the Darlington circuit 82 conduct. Since the base terminal thereof is established at zero volts and the emitter terminal at −1.5 volts during the enable pulse, it is necessary that the collector terminal thereof be connected to a potential in excess of 0 volts. If a 15-volt positive power supply is employed, for example, the collector terminal must be connected to a voltage between 0 and 15 volts. The voltage which is established at the collector terminal is a function of the magnitude of conduction of the Darlington circuit 82. This degree of conduction is, in turn, a function of the current flow in the base circuit which, furthermore, is a function of the current flow in the series circuit of variable resistor 94 and the photocell 72. Thus, in an initial alignment procedure, the variable resistor 94 is adjusted to establish the described center value for the reference level voltage, to assure that subsequent variations in the output of the photocell do not cause the reference level to vary to a level which would not permit conduction of the Darlington circuit 82.

The circuit of variable resistor 94 and photocell 72 satisfies Ohm's law when junction 76 is clamped to 0 volts and thus the following equation may be written:

$$(1) \qquad \frac{r_{72}}{r_{72}+R_{94}} (V_{92}+6) = V_{76} = 0$$

wherein $V_{92}$ is the voltage at terminal 92, $V_{76}$ is the potential at junction 76, $R_{94}$ is the value to which variable resistor 94 is set, and $r_{72}$ is the effective resistance of the photocell 72 when exposed to the background information during the enable pulse. Since the constraint is established that $V_{76} = 0$ volts during the enable pulse, and change in $r_{72}$ of the photocell will result in a change in $V_{92}$.

Although the junction 76 is clamped to zero volts, variations in $r_{72}$ will result in variations in the current flow at junction 76 and in turn in the current flow to the base external of Darlington circuit 82. This current flow is of negligible amount, and does not affect the Ohm's law relationship of equation (1), but nevertheless controls the conduction of Darlington circuit 82. As a result, the collector potential of Darlington circuit 82 will vary and control the potential $V_{83}$ to which capacitor 90 is charged, during the enable pulse. Since a 1.5-volt drop occurs from the external base to emitter terminals of the Darlington circuit 84, the value of $V_{92}$ developed across resistor 94 is equal to the value of $V_{83}$ less the potential drop of Darlington circuit 84.

The voltage $V_{83}$ established across capacitor 90 comprises the reference level voltage to which the operation of the photocell 72 is referred, or by which it is controlled, during subsequent sensing operations. Although the voltage $V_{92}$ is the voltage to which the output of the photocell is referred, in operation, it will be appreciated that the magnitude of voltage $V_{92}$ is determined by the voltage $V_{83}$ and the fixed potential difference between terminals 83 and 92 of 1.5 volts. The discharge time constant of the capacitor 90 is very long during the intervals between enable pulses due to the circuit connections. The Darlington circuit 84 is connected effectively as an emitter-follower circuit and thus presents a very high impedance to the capacitor 90. In the sensing intervals between enable pulses, the transistors 78 and 80 are nonconductive and Darlington circuit 82 is not conductive in its collector-emitter path. Thus, no discharge path for the capacitor 90 is provided in either direction from its terminal 83. Diode 81 assures adequate back bias protection for the base emitter junction of transistor 78 to prevent damage to that junction if the stored charge on capacitor 90 produces a voltage which exceeds the back bias voltage rating of the base-emitter junction.

The information sensing operations of the photocell occur, therefore, during the intervals between the reference-setting intervals defined by the enable pulses, which are therefore termed sensing intervals. During the sensing intervals between enabling pulses, the photocell 72 is exposed to either the card background or a mark carried by the card in the associated column of answer indication areas or timing marks. When exposed to background of the same illumination level as the reference illumination source, which here is, in fact, the card background, essentially no change occurs at the junction 76. When exposed to a mark, which is of reduced reflectivity and thus which produces a lower level of illumination of the photocell, the resistance of the photocell 72 increases, producing a positive-going voltage at the junction 76, resulting in conduction of transistor 96 and producing of a negative going pulse at the collector terminal of the latter. The negative going pulse is applied to the set input terminal 97 of the three-stage shift register 50' indicating detection of a mark on the card. The information thus read into the shift register is advanced by application of a pulse from line 61 to the shift input terminal 98 which advances the information of each stage of the shift register to the next successive stage.

Any apparatus that generates pulses during detection of a reference background, which pulses terminate prior to the sensing of information marks, may be the source of enabling pulses for the sensitivity control circuit of the invention. In one embodiment described above, leading edge sensors 36 and 46 (FIG. 2) produce a single enabling pulse as each set of master and test cards are advanced into their associated sensing stations. In the embodiment shown in FIG. 3, the enabling pulses are periodically generated by timing circuit 60 during passage of the cards through the associated sensing stations. In either case, the pulses produced enable transistors 78 and 80 for conduction to establish the level setting operation as described.

What is claimed is:

1. An automatic sensitivity control system for use with a photocell sensing system for correcting for undesired variations in the output of a photocell comprising:

enabling means for periodically generating an enabling pulse of a selected time interval during exposure of the photocell to a preselected reference level of illumination which does not exceed the extreme of illumination level of information to be sensed, control means responsive to the output of the photocell and enabled by each enabling pulse from said enabling means to establish a reference level corresponding to the photocell output during the selected time interval, said control means maintains the reference level thus established and references the output of the photocell to that reference level during the succeeding sensing interval to correct for undesired variations in the photocell output, and said control means comprises means connected in the energizing circuit of said photocell to control the energization thereof during each sensing interval as a function of the reference level established during the selected time interval.

2. An automatic sensitivity control system for use with a photocell sensing system for correcting for undesired variations in the output of a photocell comprising:

enabling means for periodically generating an enabling pulse of a selected time interval during exposure of the photocell to a preselected reference level of illumination, storage means, a first amplifier having an input and an output and connected at said input to said storage means and at said output to the output of said photocell, switch means connected between said storage means and said outputs of said amplifier and said photocell, said switch means being responsive to each enabling pulse from said enabling means to be switched from a normally open to a closed position, said switch means, in said closed position, connecting said storage means to said outputs of said photocell and said amplifier to charge said storage means to a reference level corresponding to the output of said photocell when exposed to said reference source of illumination and, in said open position, isolating said storage means from the said outputs, and said amplifier being responsive to said reference level of said storage means to generate a corresponding signal in said output thereof to which the output of said photocell is referenced for correcting for undesired variations in the output of said photocell.

3. An automatic sensitivity control system as recited in claim 2 wherein:

said outputs of said amplifier and said photocell are combined at a common junction to which said switch means is connected, and said switch means includes means for referencing and junction to ground potential during said enable pulse for establishing a reference level of charging of said storage means.

4. An automatic sensitivity control system as recited in claim 3 wherein:
said first amplifier includes means for adjusting the amplitude of said output thereof to establish a center value of said reference level.

5. An automatic sensitivity control system as recited in claim 2 wherein:
said switch means includes a second amplifier having an input and an output and being connected at said input to said outputs of said photocell and said first amplifier and at said output to said storage means,
said second amplifier is rendered operative during said enable pulse to respond to the output of said photocell for establishing an output potential corresponding to said photocell output in response to exposure thereof to said reference level of illumination to control charging of said storage means to a value corresponding to the potential of the output of said second amplifier, and
said second amplifier is rendered inoperative in the absence of said enabling pulse for isolating the output of said photocell from said storage means.

6. An automatic sensitivity control system as recited in claim 5 wherein:
said second amplifier includes first and second power terminals at the first power terminal of which the output thereof is derived, and said switch means further includes a first switching transistor connected between a first power supply terminal and said first power terminal and a second switch transistor connected between said second power terminal and a second power supply terminal, and
said first and second switching transistors are connected at said inputs thereof to said enabling means for responding to each enabling pulse to switch from a normally nonconductive to a conductive condition for rendering said second amplifier operative.

7. An automatic sensitivity control system as recited in claim 6 wherein:
said storage means is connected to said first power terminal of said second amplifier to be charged by current flow from said first power supply terminal through said first switching transistor, to a reference level potential value determined by the potential of the output of said second amplifier during each enable pulse.

8. An automatic sensitivity control system as recited in claim 6 wherein:
said second power supply terminal is maintained at a potential level equal to the potential drop between the input and the second power output terminal of said second amplifier to reference said junction of said first amplifier and said photocell to ground potential during each enable pulse.

9. An automatic sensitivity control system as recited in claim 1 for use with a sensing station having a photocell for sensing information from cards which are transported in succession through said sensing system, wherein:
said enabling means responds to the advancement of each such card into position for sensing by said photocell for generating an enabling pulse during exposure of the photocell to the card background prior to advancement of the information-containing portion of the card into position for sensing by the photocell.

10. An automatic sensitivity control system as recited in claim 1 for use with a sensing station having a photocell for sensing information from cards which are transported in succession through said sensing system, and which cards bear information and related timing marks displaced thereon in the direction of card travel through the sensing station, wherein:
said enabling means responds to each of the timing marks on each card transported through the sensing station for generating an enabling pulse for a selected time interval during which the photocell is exposed to the background of the card preceding the next successive timing mark, whereby a plurality of periodically generated enabling pulses are produced during sensing of a given card.

11. A data processing system having a photocell sensing system for sensing information from cards having plural columns of indication areas for receiving indicia representative of information and a column to timing marks, with corresponding groups of answer indication areas and timing marks aligned in rows, comprising:
a sensing station including a photocell corresponding to each of the columns of timing marks and answer indication areas provided on the card,
means for successively advancing said cards through said sensing station for sequential scanning of the rows of answer indication areas and timing marks,
enabling means for periodically generating an enabling pulse of a selected time interval in response to advancement of each such card through said sensing station and during exposure of the photocell to a preselected portion of the background of each such card,
control means associated with each of said photocells, each of said control means being responsive to the output of the corresponding photocell and being enabled by each enabling pulse from said enabling means to establish a reference level corresponding to the photocell output during the selected time interval, and
each of said control means maintaining the reference level thus established with regard to the output of its associated photocell and referencing the output of that photocell to the reference level during the succeeding sensing interval to correct for undesired variations in the output of the associated photocell.

12. A data processing system as recited in claim 11 wherein:
said enabling means responds to the advancement of a leading edge of each of said cards successively advanced into said sensing station for generating a corresponding enabling pulse when said photocell is exposed to a portion of the background of said card preceding the information containing portion of the card.

13. A data processing system as recited in claim 11 wherein:
said enabling means responds to the output of the photocell of said sensing station corresponding to the column of timing marks for generating an enabling pulse in response to detection of such timing mark during exposure of the photocell to a portion of the background following the detected timing mark preceding the following timing mark, whereby a plurality of enabling pulses are generated during advancement of each successive test card through the sensing station.

14. A data processing system as recited in claim 13 wherein:
said enabling means includes delay means responsive to the output of the photocell corresponding to the column of timing marks for generating an enable pulse a predetermined time period after the detection of the trailing edge of each timing mark by the said corresponding photocell.

15. An automatic sensitivity control system as recited in claim 1 wherein said control means comprises an active element having a variable voltage-current characteristic controlled in accordance with said reference level.

16. A closed loop control system for controlling the output of a transducer which responds to a varying condition to be sensed, in accordance with a preselected reference level to that condition, comprising:
storage means,
first means operable during a reference setting interval for establishing a reference level indication in said storage means in response to the output of said transducer when sensing a preselected reference level of the condition,
said first means being operable in a subsequent sensing interval to isolate said storage means from said transducer for maintaining the reference level indication established in said storage means during the sensing interval, and control means responsive to the reference level set in said storage means to control the overall response of said transducer during the sensing interval.

17. A closed loop control system as recited in claim 16 wherein said control means is connected in the energizing circuit of said transducer to control the energization thereof during each sensing interval as a function of the reference level indication of said storage means.

18. A closed loop control system as recited in claim 17 wherein said control means comprises an active element having a variable voltage-current characteristic controlled in accordance with said reference level.

19. A closed loop control system as recited in claim 18 wherein:
said active element comprises a Darlington circuit,
said storage means comprises capacitive storage means charged to a voltage level in accordance with said reference level indication, said capacitor being connected to the input of said Darlington circuit, and
said Darlington circuit is connected with its collector-emitter current conducting path in the energizing circuit of said transducer and is connected at its base to said capacitive storage means and responds to the voltage level of said reference level indication to correspondingly vary its voltage-current characteristic and thereby vary the energization of said transducer.

20. A closed loop control system as recited in claim 17 wherein:
said control means and said transducer are connected to a common junction to which said first means is connected, and
said first means includes means for referencing said common junction to ground potential during each reference setting interval to enable charging of said storage means to establish said reference level indication.

21. A closed loop control system as recited in claim 20 wherein:
said control means includes adjustable means for adjusting the level of current flow in said energizing circuit to establish a center value of said reference level indication.

22. A method of controlling the output of a transducer responsive to a varying condition to be sensed in accordance with a preselected reference level of that condition comprising:
responding to the output of the transducer when sensing the preselected reference level condition,
storing an indication of that reference level output,
isolating the stored indication of the reference level output from the output of the transducer during a sensing interval, and
controlling the overall response characteristic of the transducer in accordance with the isolated reference level indication during the sensing interval.

23. A method as recited in claim 22 wherein the control of the overall response characteristic of the transducer comprises controlling the energization of the transducer during the sensing interval thereby to control the output thereof in accordance with the preselected reference level.

* * * * *